United States Patent
Giannakopoulos et al.

(10) Patent No.: US 10,760,494 B2
(45) Date of Patent: Sep. 1, 2020

(54) TELESCOPING BORE BASKET FOR GAS TURBINE ENGINE

(71) Applicant: United Technologies Corporation, Farmington, CT (US)

(72) Inventors: Konstantinos Panagiotis Giannakopoulos, Middletown, CT (US); Andrew C. Carmack, West Hartford, CT (US); Mohammad G. Faisal, Palm Beach Gardens, FL (US)

(73) Assignee: RAYTHEON TECHNOLOGIES CORPORATION, Farmington, CT (US)

( * ) Notice: Subject to any disclaimer, the term of this patent is extended or adjusted under 35 U.S.C. 154(b) by 157 days.

(21) Appl. No.: 15/924,236

(22) Filed: Mar. 18, 2018

(65) Prior Publication Data
US 2019/0284999 A1    Sep. 19, 2019

(51) Int. Cl.
| | | |
|---|---|---|
| *F02C 7/18* | (2006.01) | |
| *F02C 3/06* | (2006.01) | |
| *F02C 9/18* | (2006.01) | |
| *F04D 29/32* | (2006.01) | |
| *F01D 5/08* | (2006.01) | |
| *F04D 29/58* | (2006.01) | |
| *F01D 25/12* | (2006.01) | |

(52) U.S. Cl.
CPC ............... *F02C 7/18* (2013.01); *F01D 5/082* (2013.01); *F01D 5/085* (2013.01); *F02C 3/06* (2013.01); *F02C 9/18* (2013.01); *F04D 29/321* (2013.01); *F04D 29/5846* (2013.01); *F04D 29/5853* (2013.01); *F01D 25/125* (2013.01); *F05D 2220/32* (2013.01); *F05D 2240/35* (2013.01); *F05D 2240/50* (2013.01); *F05D 2260/205* (2013.01)

(58) Field of Classification Search
CPC ...... F02C 7/18; F02C 9/18; F01D 5/08; F01D 5/081; F01D 5/082; F01D 5/085; F01D 5/088; F04D 29/5846; F05D 2260/205
USPC .................................... 415/115, 116
See application file for complete search history.

(56) References Cited

U.S. PATENT DOCUMENTS

| | | | |
|---|---|---|---|
| 3,647,313 A | | 3/1972 | Koff |
| 3,844,110 A | * | 10/1974 | Widlansky ............ F01D 25/125 60/39.08 |

(Continued)

FOREIGN PATENT DOCUMENTS

| | | |
|---|---|---|
| EP | 1921255 A2 | 5/2008 |
| FR | 2892148 A1 | 4/2007 |
| GB | 2266927 A | 11/1993 |

OTHER PUBLICATIONS

English Machine Translation for FR2892148 Abstract.
European Search Report for Application No. EP 19 15 1682.

*Primary Examiner* — Steven M Sutherland
(74) *Attorney, Agent, or Firm* — Cantor Colburn LLP

(57) ABSTRACT

A bore basket assembly for a gas turbine engine. The assembly includes an outer cylindrical member. The assembly also includes an inner cylindrical member at least partially surrounded by the outer cylindrical member to define an annulus therebetween, one of the cylindrical members operatively coupled to an aft rotor stage, the other of the cylindrical members operatively coupled to a forward rotor stage, the cylindrical members moveable in an axially telescoping manner relative to each other.

20 Claims, 5 Drawing Sheets

(56) References Cited

U.S. PATENT DOCUMENTS

| | | | | |
|---|---|---|---|---|
| 4,428,713 | A | * | 1/1984 | Coplin .................... F01D 25/08 415/116 |
| 4,719,747 | A | * | 1/1988 | Willkop ................. F01D 5/066 415/115 |
| 5,271,711 | A | * | 12/1993 | McGreehan ............ F01D 5/085 415/115 |
| 5,472,313 | A | | 12/1995 | Quinones et al. |
| 6,155,040 | A | * | 12/2000 | Sasaki ....................... F01D 5/00 60/806 |
| 8,915,057 | B2 | * | 12/2014 | Corattiyil .................. F02C 7/06 415/115 |
| 2007/0189890 | A1 | * | 8/2007 | Snowsill ................. F01D 5/082 415/115 |
| 2010/0104418 | A1 | * | 4/2010 | Weidmann .............. F01D 5/025 415/111 |
| 2011/0041509 | A1 | * | 2/2011 | Thompson, Jr. ........ F01D 5/081 60/772 |
| 2015/0240723 | A1 | | 8/2015 | Gons |

\* cited by examiner

TELESCOPING BORE BASKET FOR GAS TURBINE ENGINE

STATEMENT OF FEDERAL SUPPORT

This invention was made with Government support under Contract No. FA8626-16-C-2139 awarded by the United States Air Force. The Government has certain rights in the invention.

BACKGROUND

Exemplary embodiments pertain to the art of gas turbine engines and, more particularly, to a bore basket for gas turbine engines.

Gas powered turbines include a compressor section, a combustor section, and a turbine section. The compressor, combustor and turbine sections operate in conjunction with each other to generate rotation of one or more shafts extending through each of the sections. In the case of some aircraft engines, the shaft drives a fan. Each of the compressor section and the turbine section includes multiple rotors arranged sequentially along a fluid flow path. Each rotor includes a rotor bore protruding radially inward toward the shaft. Some engines include a hot air flow aft of the rotors, relative to fluid flow through the gas powered turbine. Absent a mechanical separation, hot air from the hot air flow contacts the rotor bores and significantly increases the heat to which the rotor bores are exposed.

In some examples, the rotor bores are particularly heat sensitive, and a basket is disposed between the rotor bores and the shaft. Existing baskets are constructed of a single metal cylinder disposed about the shaft(s). The basket defines a hot air passageway between the basket and the shaft, and the air from the hot air flow is passed to a return opening in the shaft through the passageway. The basket operates as a heat shield and a flow guide, providing separation between the hot air flow and sensitive rotor bores, and shielding the sensitive rotor bores from the heat of the hot air flow. However, operation of the turbine engine causes components to grow relative to each other at different rates, thereby causing issues with the connection(s) of the basket to components.

BRIEF DESCRIPTION

Disclosed is a bore basket assembly for a gas turbine engine. The assembly includes an outer cylindrical member. The assembly also includes an inner cylindrical member at least partially surrounded by the outer cylindrical member to define an annulus therebetween, one of the cylindrical members operatively coupled to an aft rotor stage, the other of the cylindrical members operatively coupled to a forward rotor stage, the cylindrical members moveable in an axially telescoping manner relative to each other.

In addition to one or more of the features described above, or as an alternative, further embodiments may include that the bore basket assembly seals a sub-section of an entire portion of a bore cavity, the sub-section at least partially defined by the bore basket assembly and a hub structure.

In addition to one or more of the features described above, or as an alternative, further embodiments may include that a conditioning fluid flow is extracted from a main fluid flow, and routed into and through the sub-section to condition at least one bore disk disposed in the subsection of the bore cavity.

In addition to one or more of the features described above, or as an alternative, further embodiments may include that the conditioning fluid flow is routed through a radial opening defined by the outer cylindrical member and into the annulus.

In addition to one or more of the features described above, or as an alternative, further embodiments may include that the radial opening is one of a plurality of radial openings defined by the outer cylindrical member, the plurality of radial openings axially aligned with each other and circumferentially spaced from each other.

In addition to one or more of the features described above, or as an alternative, further embodiments may include that the conditioning fluid flow is routed along the annulus and through a plurality of flow slots, the conditioning fluid flow expelled from the bore basket assembly.

In addition to one or more of the features described above, or as an alternative, further embodiments may include that the conditioning fluid flow is expelled from the bore basket assembly through a bleed port into at least one of a bearing compartment, an intermediate case, a customer bleed port, a primary flowpath, and back into the high compressor flowpath In addition to one or more of the features described above, or as an alternative, further embodiments may include that the at least one bore disk and the outer cylindrical member define a radial clearance therebetween.

In addition to one or more of the features described above, or as an alternative, further embodiments may include that the outer cylindrical member is operatively coupled to the aft rotor stage and the inner cylindrical member is operatively coupled to the forward rotor stage.

In addition to one or more of the features described above, or as an alternative, further embodiments may include that the inner cylindrical member is operatively coupled to the aft rotor stage and the outer cylindrical member is operatively coupled to the forward rotor stage.

In addition to one or more of the features described above, or as an alternative, further embodiments may include that the aft rotor stage is the last rotor stage of the sub-section of the bore cavity.

Also disclosed is a gas turbine engine including a compressor section, a combustor section, and a turbine section. The gas turbine engine also includes a bore basket assembly disposed in the compressor section. The bore basket assembly includes an outer cylindrical member. The bore basket assembly also includes an inner cylindrical member surrounding a portion of a shaft operatively coupling the turbine section and the compressor section, the inner cylindrical member at least partially surrounded by the outer cylindrical member to define an annulus therebetween, the cylindrical members moveable in an axially telescoping manner relative to each other.

In addition to one or more of the features described above, or as an alternative, further embodiments may include that the compressor section includes a bore cavity, a sub-section of the bore cavity at least partially defined by the bore basket assembly and a hub structure, the sub-section extending axially from a forward rotor stage to an aft rotor stage.

In addition to one or more of the features described above, or as an alternative, further embodiments may include that the outer cylindrical member is operatively coupled to the aft rotor stage and the inner cylindrical member is operatively coupled to the forward rotor stage.

In addition to one or more of the features described above, or as an alternative, further embodiments may include that a conditioning fluid flow is extracted from a main fluid flow, and routed into and through the sub-section to condition at least one bore disk disposed in the sub-section of the bore cavity.

In addition to one or more of the features described above, or as an alternative, further embodiments may include that the conditioning fluid flow is routed through a radial opening defined by the outer cylindrical member and into the annulus.

In addition to one or more of the features described above, or as an alternative, further embodiments may include that the radial opening is one of a plurality of radial openings defined by the outer cylindrical member, the plurality of radial openings axially aligned with each other and circumferentially spaced from each other.

In addition to one or more of the features described above, or as an alternative, further embodiments may include that the conditioning fluid flow is routed along the annulus and through a plurality of flow slots, the conditioning fluid flow expelled from the bore basket assembly.

In addition to one or more of the features described above, or as an alternative, further embodiments may include that the conditioning fluid flow is expelled from the bore basket assembly through a bleed port into at least one of a bearing compartment, an intermediate case, a customer bleed port, a primary flowpath, and back into the high compressor flowpath.

The foregoing features and elements may be combined in various combinations without exclusivity, unless expressly indicated otherwise. These features and elements as well as the operation thereof will become more apparent in light of the following description and the accompanying drawings. It should be understood, however, that the following description and drawings are intended to be illustrative and explanatory in nature and non-limiting.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Figure 1:
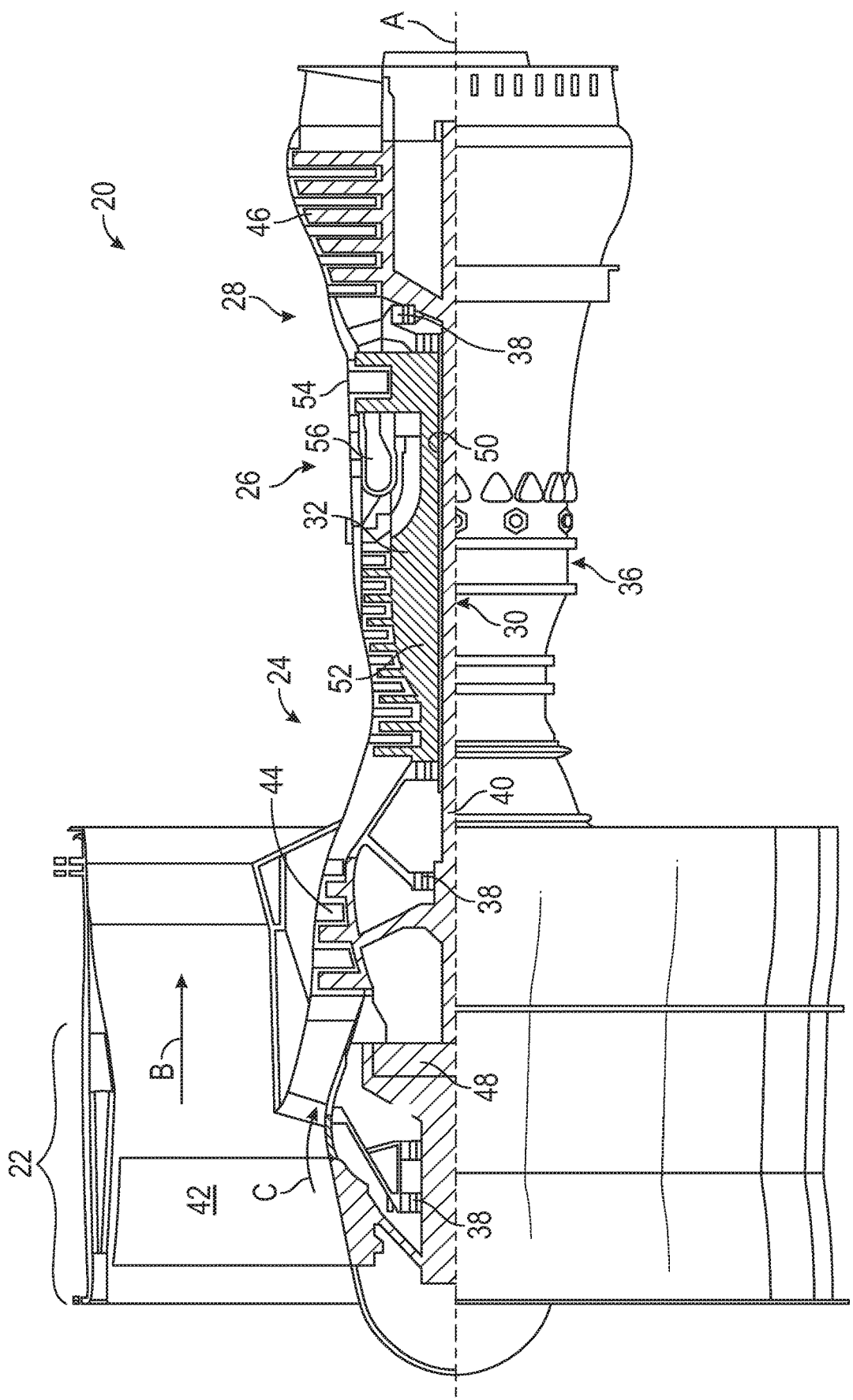
FIG. 1 is a partial cross-sectional view of a gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include an augmentor section (not shown) among other systems or features. The fan section 22 drives air along a bypass flow path B in a bypass duct, while the compressor section 24 drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis. A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a low pressure compressor 44 and a low pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a high pressure compressor 52 and high pressure turbine 54. A combustor 56 is arranged in exemplary gas turbine 20 between the high pressure compressor 52 and the high pressure turbine 54. An engine static structure 36 is arranged generally between the high pressure turbine 54 and the low pressure turbine 46. The engine static structure 36 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five (5:1). Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present disclosure is applicable to other gas turbine engines including direct drive turbofans.

A significant amount of thrust is provided by the bypass flow B due to the high bypass ratio. The fan section 22 of the engine 20 is designed for a particular flight condition— typically cruise at about 0.8 Mach and about 35,000 feet (10,688 meters). The flight condition of 0.8 Mach and 35,000 feet (10,688 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of [(Tram ° R)/(518.7° R)]$^{0.5}$. The "Low corrected fan tip speed" as disclosed herein according to one non-limiting embodiment is less than about 1150 ft/second (350.5 m/sec).

Figure 2:
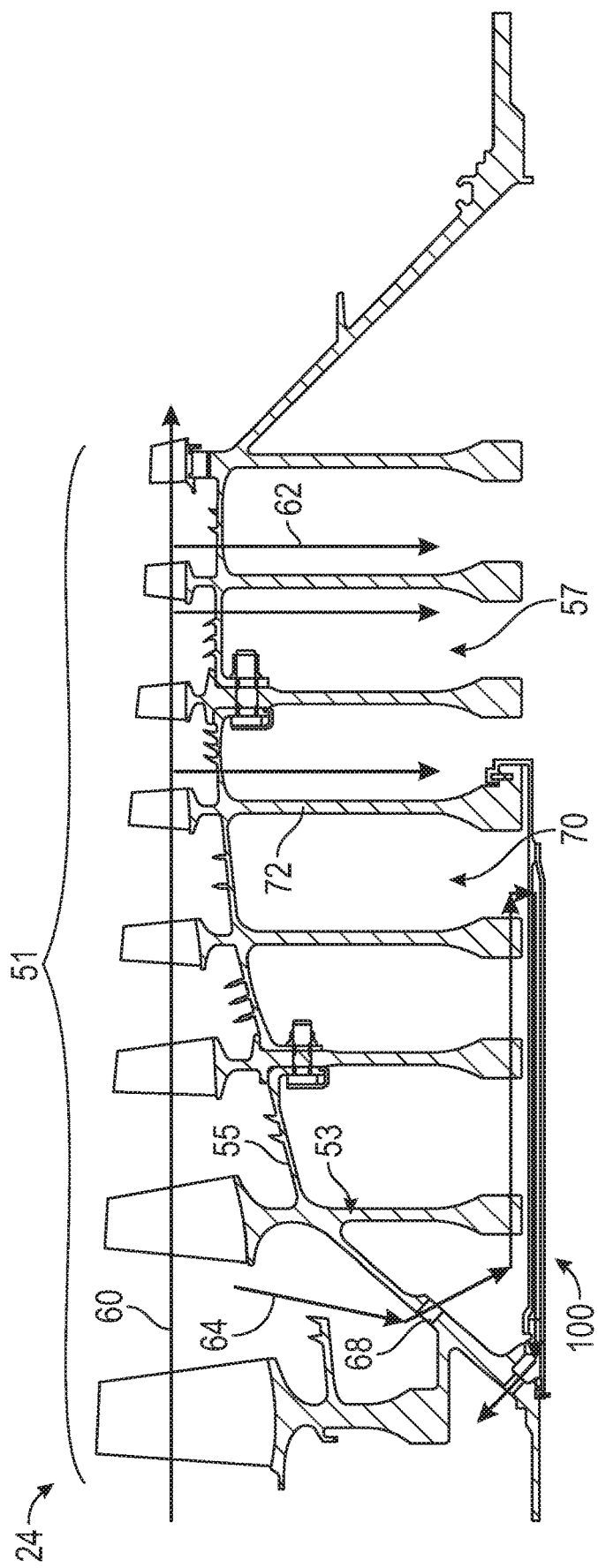
FIG. 2 is an elevational view of a compressor section of the gas turbine engine.

Referring now to FIG. 2, with continued reference to FIG. 1, a portion of the gas turbine engine 20 is illustrated in greater detail. In particular, the compressor section 24 is illustrated. The compressor section 24 includes a plurality of rotor blades, collectively referenced with numeral 51 in FIG. 2. Each of the rotor blades 51 are coupled at their root to a respective bore disk, the bore disks collectively referenced with numeral 53. In the illustrated embodiment, eight rotor stages are included, but it is to be appreciated that compressor sections containing alternative numbers of stages may benefit from the embodiments described herein. Furthermore, it is contemplated that engine sections other than the compressor section 24, such as a turbine section, may incorporate the embodiments described herein.

As shown in FIG. 2, the bore disks 53 may be directly or indirectly coupled to each other in any suitable manner to form a hub structure 55. Radially inward of the hub structure 55 is a bore cavity 57. The bore disks 53 extend radially inwardly from the rotor blades 53 into the bore cavity 57. The bore disks 53 extend toward a central shaft, such as the outer shaft 50 which connects the compressor section 24 and the high pressure turbine 54 (FIG. 1).

Various fluid flow paths are shown in FIG. 2. A main fluid flow 60 passing over the rotor blades 51 increases in temperature as it passes over the various rotor stages. In other words, the main fluid flow 60 is hotter at the downstream stages, and theoretically hottest at the aft stage. As shown, hot fluid flows 62 are extracted from the main fluid flow 60 at downstream stages. In the illustrated embodiment, three hot fluid flows are extracted at the aft three stages, but it is to be appreciated that more or fewer stages may extract what is referred to as the hot fluid flow 62 in other embodiments. In contrast, a conditioning fluid flow 64 is extracted from the main fluid flow 60 at an upstream stage, such as proximate a first rotor stage, for example. The conditioning fluid flow 64 passes through an aperture 68, or other fluid extraction device, defined by the hub structure 55. The conditioning fluid flow 64 enters a sub-section 70 of the bore cavity 57 that is sealed off from the hot fluid flow 62 present in other portions of the overall bore cavity 57. The sub-section 70 is defined by the hub structure 55, an aft bore disk 72 and a bore basket assembly 100. The bore basket assembly 100 is a telescoping assembly that is described in detail herein.

Figure 3:
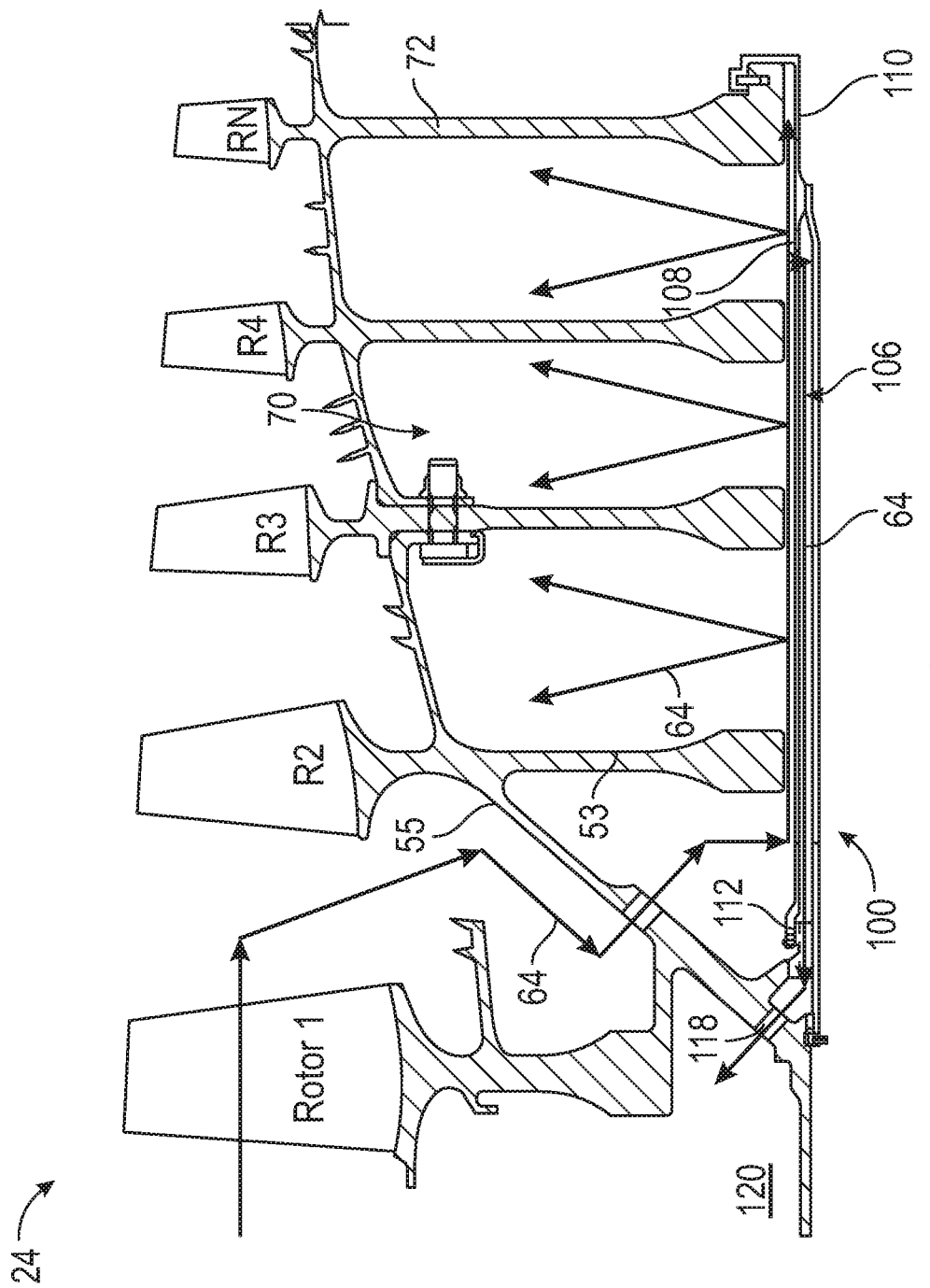
FIG. 3 is an elevational view of a portion of the compressor section.

Referring now to FIG. 3, the portion of the compressor section 24 containing the sub-section 70 of the overall bore cavity 57 is illustrated. In the illustrated embodiment, five rotor stages are illustrated, but it is to be understood that more or fewer stages may be associated with the sub-section 70, as made clear by the designation of the aft rotor as RN. The first stage rotor blade is represented with R1, the second stage rotor blade with R2, the third stage rotor blade with R3, and the fourth stage rotor blade with R4. As described above, the sub-section 70 is defined by the hub structure 55, the bore basket assembly 100, and the aft bore disk 72 which is associated with the rotor blade RN.

Figure 4:
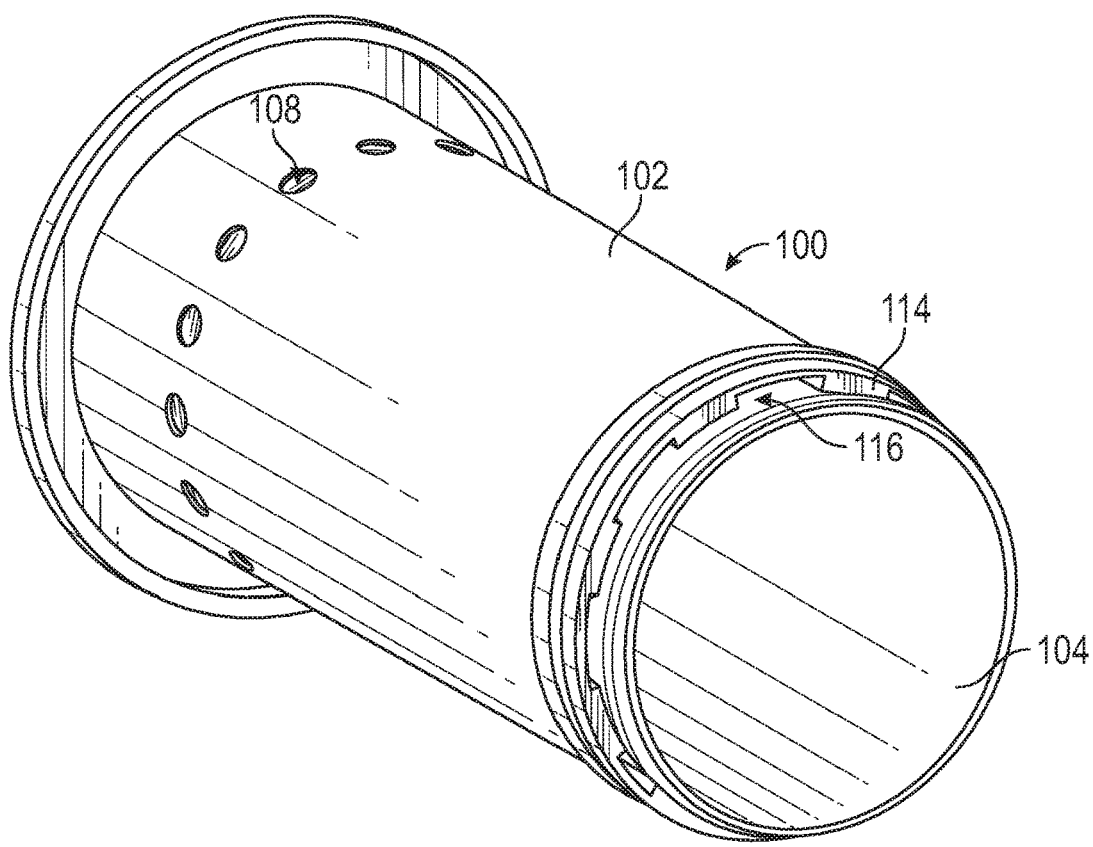
FIG. 4 is a perspective view of a bore basket assembly.
Figure 5:
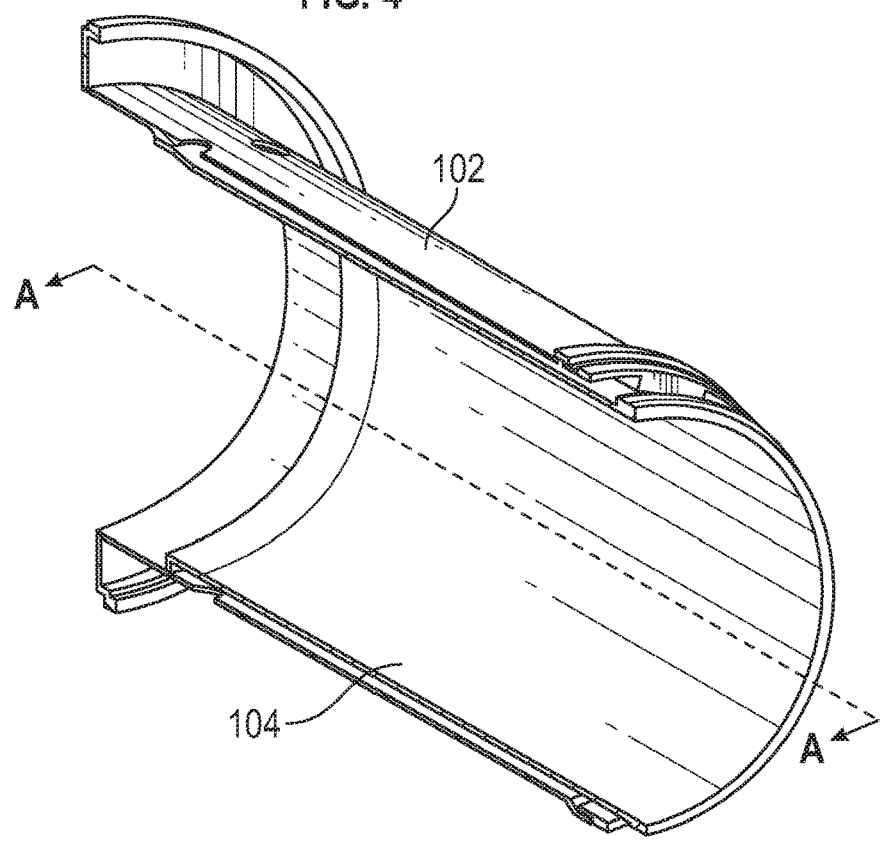
FIG. 5 is a perspective, cut-away view of the bore basket assembly.

Referring to FIGS. 4 and 5, with continued reference to FIG. 3, the bore basket assembly 100 includes an outer cylindrical member 102 and an inner cylindrical member 104. The outer cylindrical member 102 radially surrounds at least a portion of the inner cylindrical member 104 to dispose the cylindrical members 102, 104 in a concentric arrangement. An annulus 106 (FIGS. 3, 6 and 7) is defined by an inner surface of the outer cylindrical member 102 and an outer surface of the inner cylindrical member 104. The inner cylindrical member 104 surrounds a portion of the outer shaft 50 (FIG. 1). In some embodiments, one or more shafts in the general area of the bore basket assembly 100 are not present.

As shown in FIG. 3, to condition the sub-section 70 of the bore cavity 57, the conditioning fluid flow 64 is provided from a forward portion of the hub structure 55 into the sub-section 70 of the bore cavity 57. The conditioning fluid flow 64 flows aft, into the bore cavity 57 and between the bore disks 53 and the outer cylindrical member 102. The conditioning fluid flow 64 comes into contact with each of the bore disks 53 within the sub-section 70, thereby conditioning the bore disks 53. The conditioning fluid flow 64 then flows into at least one radial opening 108 defined by the outer cylindrical member 102. The at least one radial opening is located closer to an aft end 110 of the outer cylindrical member 102, relative to a forward end 112 of the outer cylindrical member 102. The at least one radial opening 108 allows air to flow from the bore cavity 57 into the annulus 106 defined by the cylindrical members 102, 104. In some embodiments, such as the illustrated embodiment, the outer cylindrical member 102 defines a plurality of radial openings 108 which are circumferentially spaced from each other to efficiently distribute the flow within the annulus 106. The number of radial openings, as well as the size, geometry and spacing of the radial openings, may be customized to provide desired metered flow characteristics for different applications. Considerations associated with the customization based on the radial openings include, but are not limited to flow requirements needed for bore conditioning, exit pressure, velocity and flow rate.

The bore basket assembly 100 forces the conditioning fluid flow 64 along the annulus 106 toward the forward end 112 of the outer cylindrical member 102. As shown in FIGS. 4 and 5, the inner cylindrical member 104 includes a radially outwardly extending flange 114 that engages the forward end 112 of the outer cylindrical member 102. A plurality of circumferentially spaced flow slots 116 are defined by flange 114 to allow the conditioning fluid flow 64 to escape from the annulus 106. The number of flow slots, as well as the size, geometry and spacing of the flow slots, may be customized to provide desired metered flow characteristics for different applications. Considerations associated with the customization based on the flow slots include, but are not limited to flow requirements needed for bore conditioning, exit pressure, velocity and flow rate.

As shown in FIG. 3, the conditioning fluid flow 64 passes through the flow slots 116 and may be distributed to any other part of the engine through one or more bleed ports 118 or the like. In the illustrated example, the conditioning fluid flow 64 may be sent to a bearing compartment 120, but it is to be appreciated that the flow may be directed to another engine location or sent overboard. The fluid circuit described above in connection with the sub-section 70 of the bore cavity 57 provides conditioning of the bore disks 53 within the sub-section 70 to allow the bore disks 53 to grow at a steady uniform rate for different bore disk materials. The bore cavity conditioning also facilitates tip clearance control of the rotor blade tips relative to an outer casing surrounding the rotor blades.

Figure 6:
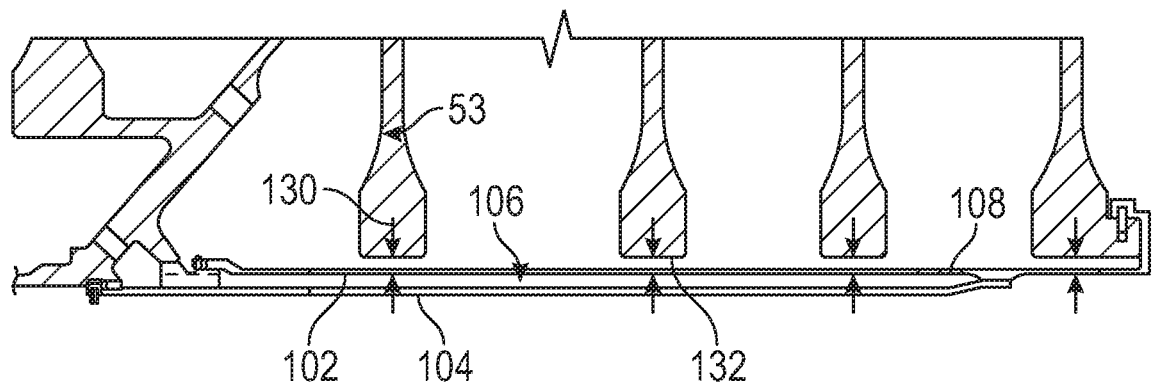
FIG. 6 is a sectional view of the bore basket assembly taken along line A-A of FIG. 5, the bore basket assembly disposed in the compressor section.

Referring to FIG. 6, a radial clearance 130 is provided between the inner diameter 132 of the bore disks 53 and the outer cylindrical member 102. The radial clearance 130 allows the conditioning fluid flow 64 to be routed throughout the sub-section 70 of the bore cavity 57 to the radial opening(s) 108. The radial clearance 130 height will vary depending on the materials and the amount of bore cavity conditioning required.

Figure 7:
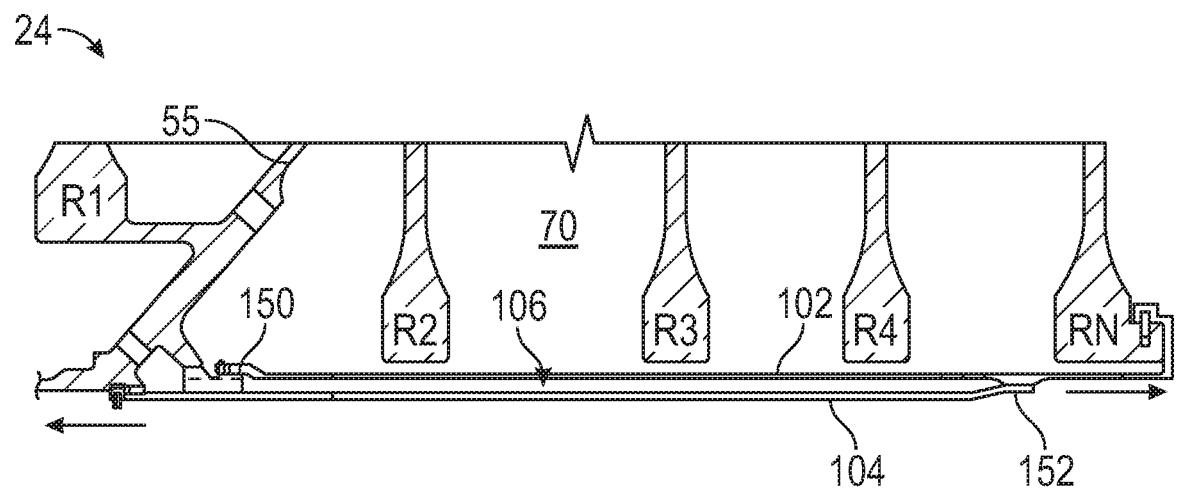
FIG. 7 is a sectional view of the bore basket assembly taken along line A-A of FIG. 5, the bore basket assembly disposed in the compressor section, a telescoping motion of the bore basket assembly being illustrated.

Referring to FIG. 7, a telescoping movement feature of the bore basket assembly 100 is illustrated. The outer cylindrical member 102 is operatively coupled (directly or indirectly) to aft rotor RN. Coupling may be made with a ring structure or in any alternative suitable manner. The inner cylindrical member 104 is operatively coupled to the hub structure 55 proximate the first stage rotor R1. As with the outer cylindrical member 102, the inner cylindrical member 104 may be coupled with a ring structure or in any alternative suitable manner. It is contemplated that a reverse configuration may be made, with the inner cylindrical member 104 being operatively coupled to the aft rotor RN and the outer cylindrical member 102 being operatively coupled to the first stage rotor R1.

First stage rotor R1 is cooler than aft rotor RN during operation of the compressor section 24. As such, aft rotor RN will grow faster than first stage rotor R1 due to operating temperature differences. RN will grow radially outward and in an aft direction, thereby pulling the outer cylindrical member 102 in the aft direction due to the coupled relationship. R1 will grow radially outward and in a forward direction, thereby pulling the inner cylindrical member 104 in the forward direction due to the coupled relationship. By having each cylindrical member 102, 104 operatively coupled to a single, opposite rotor stage, the telescoping movement of the bore basket assembly 100 is achieved. This telescoping movement accommodates the different thermal growth rates, while maintaining a sealed sub-section 70 of the bore cavity 57. Such sealing allows better control of the bore disk growth rate control for different and similar materials.

The telescoping nature of the bore basket assembly 100 removes mating damage at potential wear surfaces on major rotating parts and places the wear surfaces on the bore basket assembly 100, which is an easily replaceable part. Examples of wear surfaces are represented with numerals 150, 152.

The embodiments described herein provides a sealed cavity for bore disks to grow at a similar rate for different and similar materials, but does not seal the entire bore cavity of the compressor section. The embodiments also allow for the compressor section to have multiple air bleeds.

The term "about" is intended to include the degree of error associated with measurement of the particular quantity based upon the equipment available at the time of filing the application. For example, "about" can include a range of ±8% or 5%, or 2% of a given value.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A bore basket assembly for a gas turbine engine comprising:
    an outer cylindrical member;
    a plurality of radial openings located in the outer cylindrical member;
    an inner cylindrical member at least partially surrounded by the outer cylindrical member to define an annulus therebetween, one of the cylindrical members operatively coupled to an aft rotor stage, the other of the cylindrical members operatively coupled to a forward rotor stage, the inner cylindrical member and the outer cylindrical member moveable in an axially telescoping manner with respect to each other; and
    a flange extending radially outward from the inner cylindrical member, the flange defining a plurality of circumferentially spaced flow slots between the outer cylindrical member and the inner cylindrical member, the plurality of circumferentially spaced flow slots providing fluid communication between the annulus and a bleed port, the bleed port being located in the forward rotor stage.

2. The bore basket assembly of claim 1, wherein the bore basket assembly seals a sub-section of an entire portion of a bore cavity, the sub-section at least partially defined by the bore basket assembly and a hub structure.

3. The bore basket assembly of claim 2, wherein the aft rotor stage is a last rotor stage of the sub-section of the bore cavity.

4. The bore basket assembly of claim 2, wherein at least one bore disk is disposed in the subsection of the bore cavity and the at least one bore disk is radially spaced from the outer cylindrical member.

5. The bore basket assembly of claim 4, wherein a conditioning fluid flow must past between the at least one bore disk and the outer cylindrical member prior to entering the annulus through the plurality of radial openings located in the outer cylindrical member.

6. The bore basket assembly of claim 4, wherein the at least one bore disk is a plurality of bore disks each being radially spaced from the outer cylindrical member.

7. The bore basket assembly of claim 1, wherein the plurality of radial openings are axially aligned with each other and circumferentially spaced from each other.

8. The bore basket assembly of claim 1, wherein the plurality of radial openings are adjacent to an aft end of the bore basket assembly.

9. The bore basket assembly of claim 1, wherein the bleed port is in fluid communication with at least one of a bearing compartment, an intermediate case, a customer bleed port, a primary flowpath, and a high compressor flowpath.

10. The bore basket assembly of claim 1, wherein the outer cylindrical member is operatively coupled to the aft rotor stage and the inner cylindrical member is operatively coupled to the forward rotor stage.

11. The bore basket assembly of claim 1, wherein the inner cylindrical member is operatively coupled to the aft rotor stage and the outer cylindrical member is operatively coupled to the forward rotor stage.

12. A gas turbine engine comprising:
a compressor section;
a combustor section;
a turbine section; and
a bore basket assembly disposed in the compressor section, the bore basket assembly comprising:
an outer cylindrical member; and
a plurality of radial openings located in the outer cylindrical member;
an inner cylindrical member surrounding a portion of a shaft operatively coupling the turbine section and the compressor section, the inner cylindrical member at least partially surrounded by the outer cylindrical member to define an annulus therebetween, one of the cylindrical members operatively coupled to an aft rotor stage, the other of the cylindrical members operatively coupled to a forward rotor stage, the inner cylindrical member and the outer cylindrical member moveable in an axially telescoping manner with respect to each other; and
a flange extending radially outward from the inner cylindrical member, the flange defining a plurality of circumferentially spaced flow slots between the outer cylindrical member and the inner cylindrical member, the plurality of circumferentially spaced flow slots providing fluid communication between the annulus and a bleed port, the bleed port being located in the forward rotor stage.

13. The gas turbine engine of claim 12, the compressor section including a bore cavity, a sub-section of the bore cavity at least partially defined by the bore basket assembly and a hub structure, the sub-section extending axially from a forward rotor stage to an aft rotor stage.

14. The gas turbine engine of claim 13, wherein the outer cylindrical member is operatively coupled to the aft rotor stage and the inner cylindrical member is operatively coupled to the forward rotor stage.

15. The gas turbine engine of claim 14, wherein at least one bore disk is disposed in the sub-section of the bore cavity and the at least one bore disk is radially spaced from the outer cylindrical member.

16. The gas turbine engine of claim 15, wherein a conditioning fluid flow must pass between the at least one bore disk prior to entering the annulus through the plurality of radial openings located in the outer cylindrical member.

17. The gas turbine engine of claim 16, wherein the plurality of radial openings are axially aligned with each other and circumferentially spaced from each other.

18. The gas turbine engine of claim 12, wherein the plurality of radial openings are adjacent to an aft end of the bore basket assembly.

19. The gas turbine engine of claim 12, wherein the bleed port is in fluid communication with at least one of a bearing compartment, an intermediate case, a customer bleed port, a primary flowpath, and a high compressor flowpath.

20. A method of cooling a portion of a gas turbine engine, comprising:
locating a bore basket assembly in a compressor section of the gas turbine engine, the bore basket assembly comprising; an outer cylindrical member, a plurality of radial openings located in the outer cylindrical member; an inner cylindrical member surrounding a portion of a shaft operatively coupling the turbine section and the compressor section, the inner cylindrical member at least partially surrounded by the outer cylindrical member to define an annulus therebetween, the inner cylindrical member and the outer cylindrical member moveable in an axially telescoping manner with respect to each other, and a flange extending radially outward from the inner cylindrical member, the flange defining a plurality of circumferentially spaced flow slots between the outer cylindrical member and the inner cylindrical member, the plurality of circumferentially spaced flow slots providing fluid communication between the annulus and a bleed port, the bleed port being located in the forward rotor stage; and
directing a cooling flow through the annulus by first passing the cooling into the plurality of radial openings and then through the plurality of circumferentially spaced flow slots in order to provide the cooling flow to the bleed port, wherein the plurality of radial openings are adjacent to an aft end of the bore basket assembly and the plurality of circumferentially spaced flow slots are located adjacent to a forward end of the bore basket assembly.

* * * * *